April 15, 1958  C. W. MEDHURST  2,830,501
MACHINE FOR USE IN THE MANUFACTURE OF PROFILE TEMPLATES
Filed Dec. 6, 1954  6 Sheets-Sheet 1
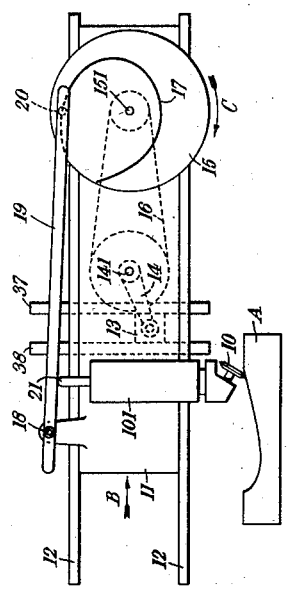
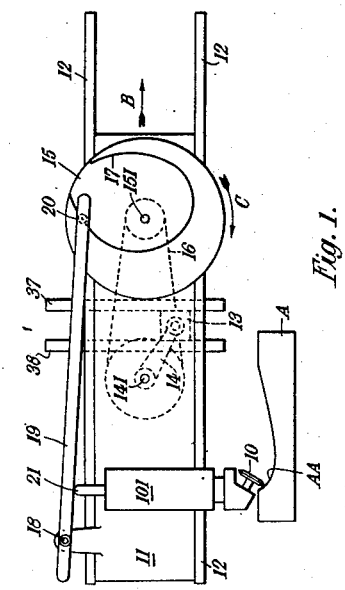
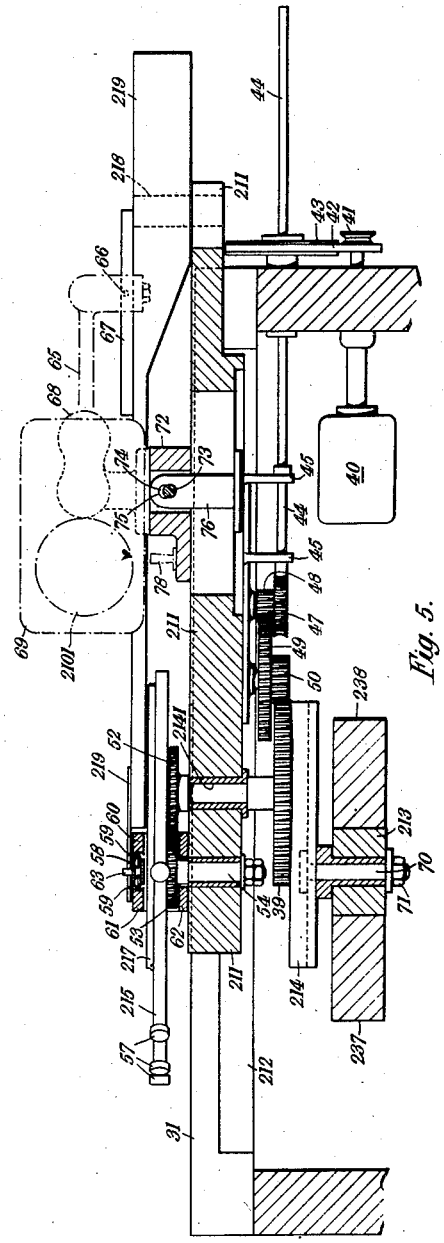
INVENTOR
Cyril W. Medhurst
By Watson, Cole, Grindle & Watson
ATTORNEYS

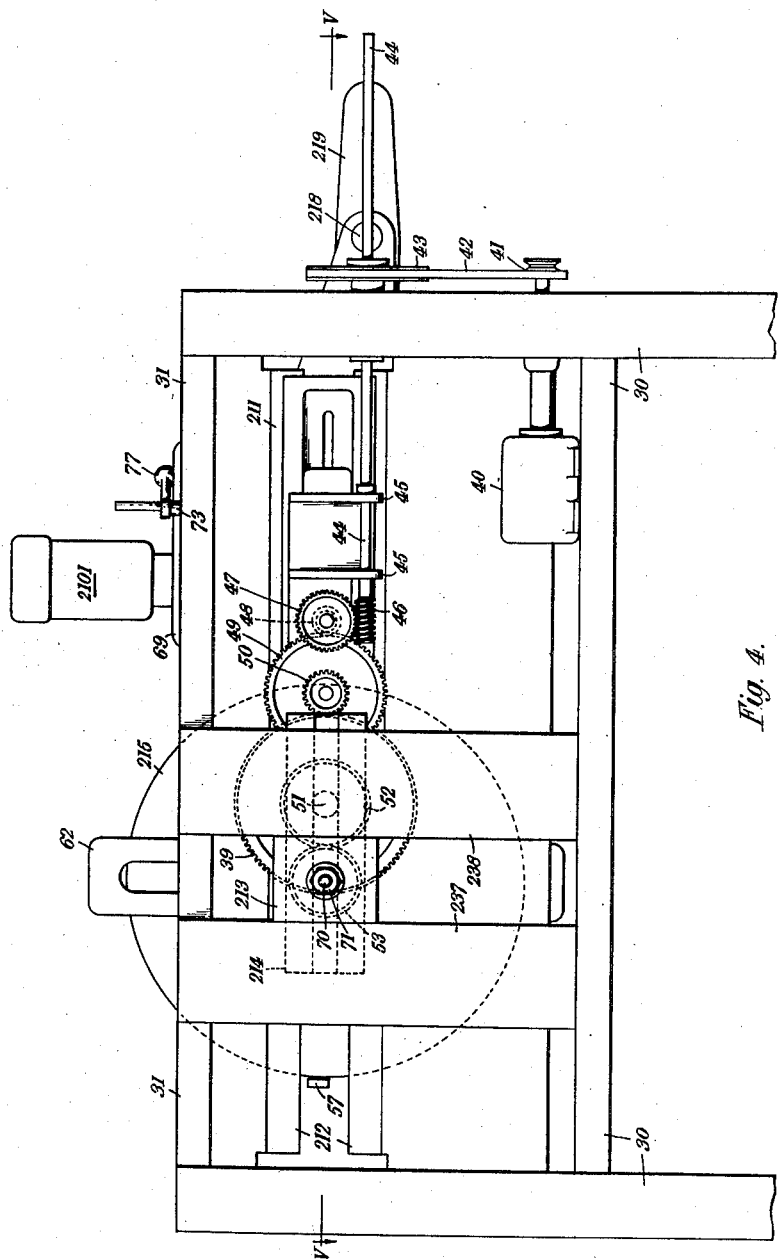

April 15, 1958 C. W. MEDHURST 2,830,501
MACHINE FOR USE IN THE MANUFACTURE OF PROFILE TEMPLATES
Filed Dec. 6, 1954 6 Sheets-Sheet 4

INVENTOR
Cyril W. Medhurst
By Watson, Cole, Grindle &
Watson
ATTORNEYS

April 15, 1958 C. W. MEDHURST 2,830,501
MACHINE FOR USE IN THE MANUFACTURE OF PROFILE TEMPLATES
Filed Dec. 6, 1954 6 Sheets-Sheet 6

INVENTOR
Cyril W. Medhurst
By Watson, Cole, Grindle &
Watson
ATTORNEYS

United States Patent Office 2,830,501
Patented Apr. 15, 1958

2,830,501

MACHINE FOR USE IN THE MANUFACTURE OF PROFILE TEMPLATES

Cyril William Medhurst, Woking, England, assignor to Vickers-Armstrongs Limited, London, England Application December 6, 1954, Serial No. 473,407

Claims priority, application Great Britain December 15, 1953

3 Claims. (Cl. 90—13)

The invention is concerned with machines for use in cutting or machining profile templates, such as may be used in the production of model aerofoils, and for shaping the profiles of three-dimensional objects such as the model aerofoils themselves, the object being to provide a machine which will enable such templates to be cut or shaped with a higher degree of accuracy and much more expeditiously than has heretofore been possible by manual processes.

A machine according to the invention comprises a cutting head mounted for and capable of rectilinear movement simultaneously in two directions respectively corresponding to the "x" and "y" ordinates of the required profile, means for traversing said cutting head in the first of such directions at a given speed, and mechanism operating in timed relationship with said traversing means to effect movement of the cutting-head in the second of such directions, said mechanism being controlled through the medium of a rotating cam which is shaped in conformation with a polar co-ordinate curve representing graphically the successive "y" ordinates of said profile, and which is connected with said mechanism by a cam-follower cooperating with said cam.

The "x" ordinate movement of the cutting-head may be brought about by the rotation of a crank suitably linked to a sliding carrier on which the cutting-head is mounted, whilst the "y" ordinate movement may be produced through the medium of a multiplying lever carrying said cam-follower, the arrangement being such that the length of "x" ordinate movement is determined by the throw of the crank, and the range of the "y" ordinate movement is determined by the effective ratio of the multiplying lever.

In order to adapt the device to the surface machining of a three-dimensional object, the work-piece may be fixedly mounted upon a table which is capable of being traversed in a direction normal to the plane of operation of the cutter, so that after each cutting operation the work-piece may be moved in said direction, the desired surface being achieved by a plurality of cutting operations executed along closely spaced parallel lines.

Said work-piece holder, which will take the form of a conventional slide-rest, may be adapted to support and hold securely an object, such as an aerofoil, of which one dimension considerably exceeds another, and the work-piece in the form of a suitably shaped billet will be set up so that the successive cutting operations are executed in a direction parallel to the chord. The frame of the machine will be arranged to span the billet on its support and to accommodate the same as it is traversed in the direction normal to the plane of the cutting operation.

The manner in which the invention may be carried into effect is hereinafter described with reference to the accompanying drawings. In said drawings, Figs. 1 and 2 are diagrams illustrating schematically the principle according to which the improved profile-cutting machine is operated, respectively depicting the relative positions occupied by the essential members of the machine at the commencement and termination of a cutting stroke.

Figs. 3 to 7 are illustrations of an embodiment of the invention as applied to a simple two-dimensional template-cutting machine, Fig. 3 being a front elevation, Fig. 4 a rear elevation, Fig. 5 a sectional view taken on the line V—V of Fig. 4, Fig. 6 a sectional elevation taken approximately on the line VI—VI of Fig. 3, and Fig. 7 being a section taken approximately on the line VII—VII of Fig. 3.

Figure 3:
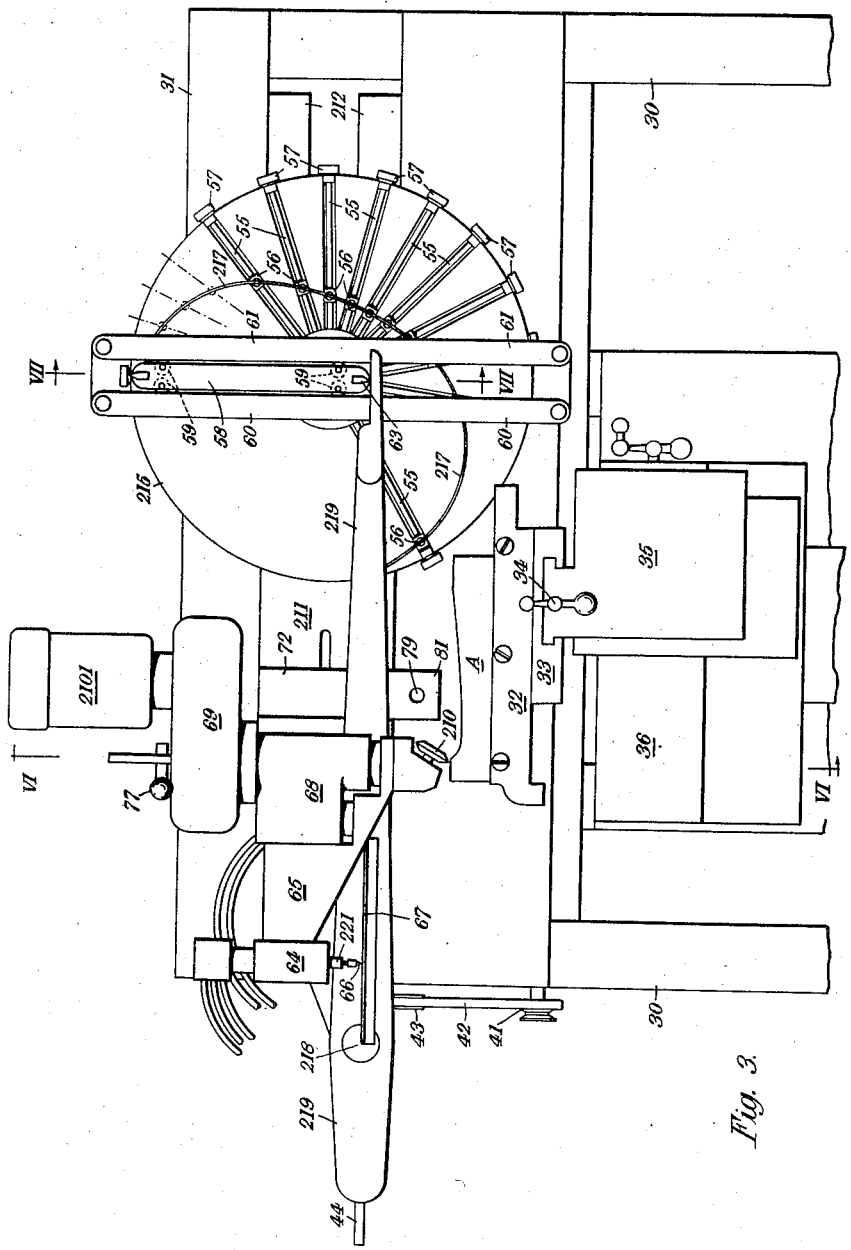
Figure 6:
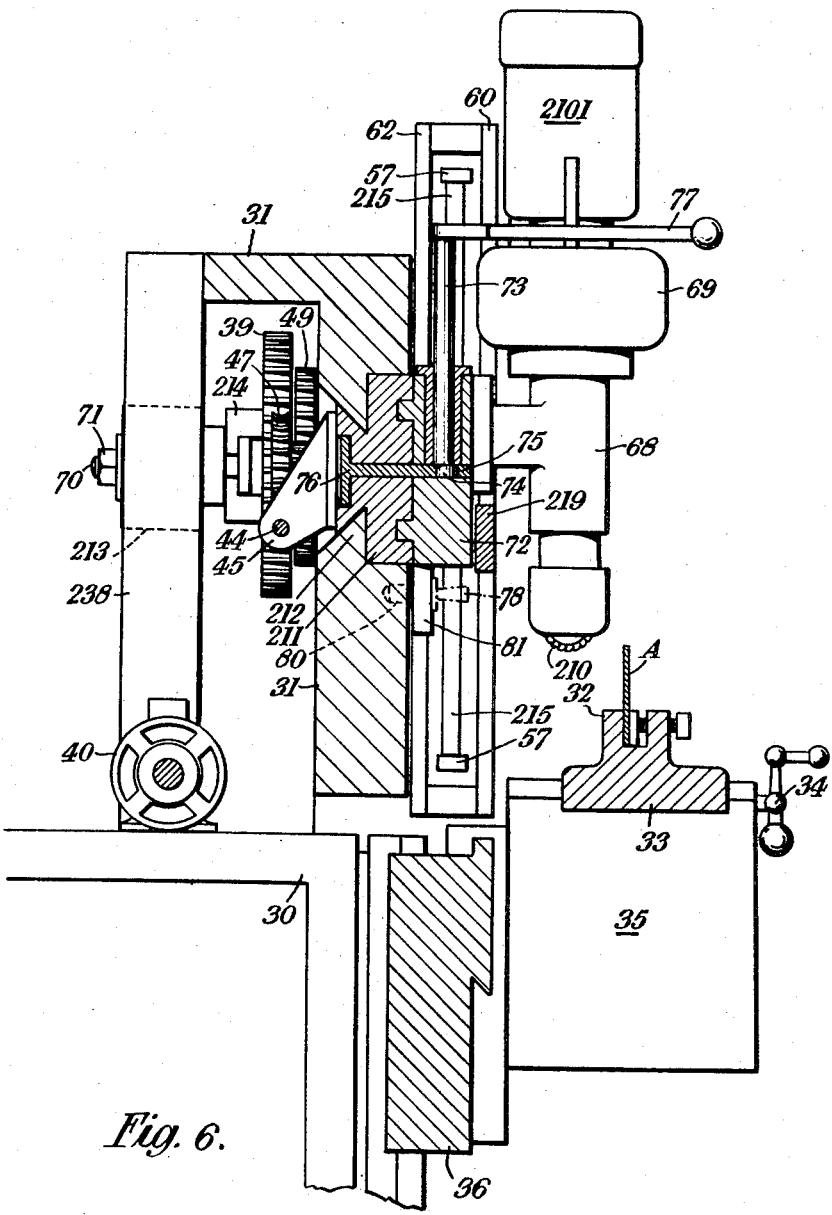
Figure 7:
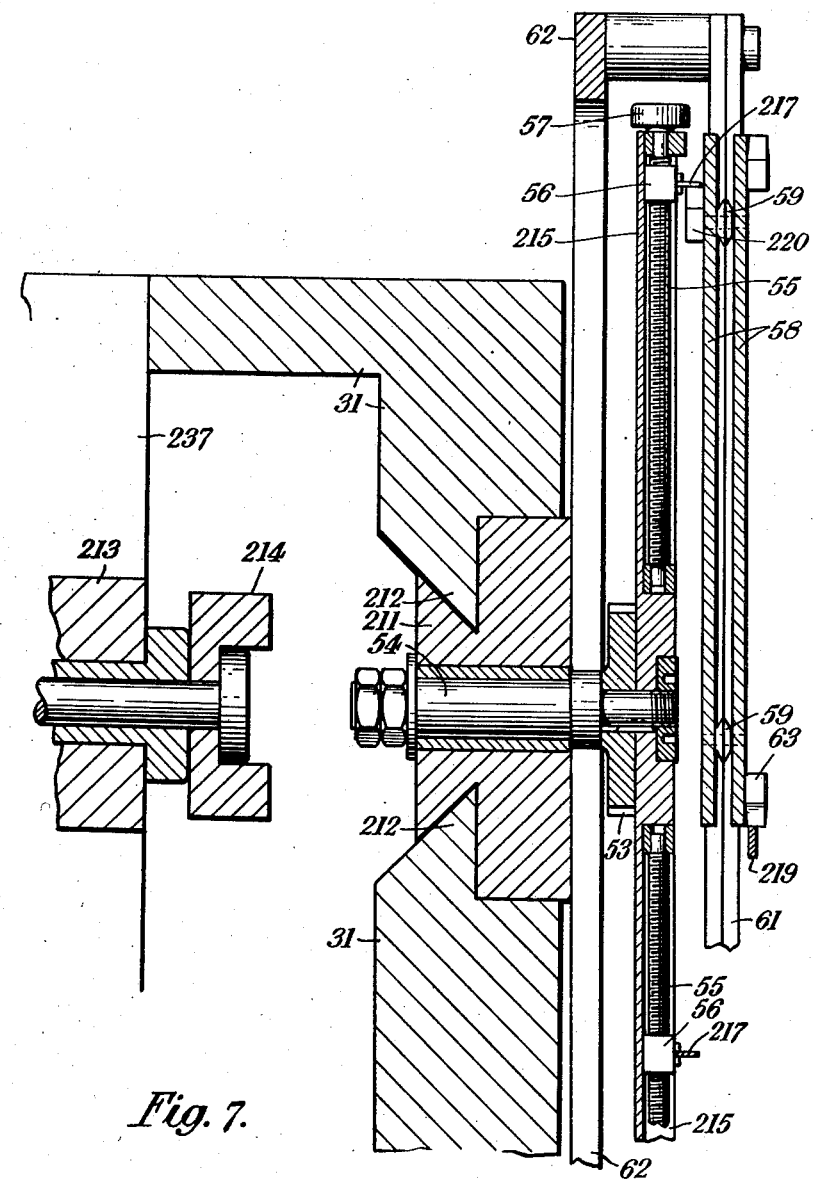

Referring to Figs. 1 and 2, it will be seen that a machine for cutting the profile of a two-dimensional aerofoil template (or analogous object) A comprises essentially a rotary milling cutter 10 which is mounted upon a carriage 11 slidably mounted upon horizontal slides 12, a connection being made between said carriage 11 and a cross-head 13 which is operated by a rotating crank 14. The cross-head guides 37, 38 are fixed at right-angles to the table movement, so that the crank 14 and its bearings 141 are constrained to move with the carriage 11 in the direction of the arrow B. The throw of said crank 14 is preferably adjustable for the purpose of varying the distance through which the carriage 11 (and consequently the cutting-head 10) is traversed during a semi-revolution of the crank.

Mounted on said sliding carriage 11 is a disc 15 rotatable about an axis 151 parallel to that of the crank 14 and driven from the latter through suitable gearing 16. Said disc 15 carries on its face a cam constituted by a spline 17 which is shaped in conformation with a polar diagram representing the "y" ordinates of the template profile.

At the other end of the carriage 11, at a point thereon remote from the cam disc 15 with respect to the cutting-head 10, is a fulcrum 18 on which is pivoted a lever arm 19 carrying a cam-follower 20 which is arranged to cooperate with said spline 17. At an intermediate point in its length the lever-arm 19 rests against the plunger 21 which is operatively associated with the cutting-head 10 in such manner that the position of the latter with respect to its movement normal to the direction of sliding movement of the carriage 11 is governed by the instantaneous position of the lever-arm 19, as determined by the shape of the spline 17, and furthermore in such manner that the reaction on the cutting head 10 cannot be transmitted to the plunger 21.

The length of the spline 17 is such that it will be traversed by the cam-follower 20 on the lever-arm 19 during the rotation of the disc 15 in the direction of the arrow C through slightly less than 360°, and the ratio of the gear drive 16 between the crank 14 and the disc 15 is chosen so that the latter will rotate to that extent during the revolution of the crank between opposite dead-centre positions.

In use, a blank for the template is set up in a vise (not shown in Figs. 1 and 2) which is provided beneath the carriage 11 so that the cutting head 10 will traverse along the edge of the blank. A motor 101 driving the tool 10 is started and the crank 14 and disc 15 are set in motion. As the cam-follower 20 moves along the spline 17 the lever-arm 19 is depressed or raised, according to the changing shape of the spline 17, and its movements are reproduced on a reduced scale by the plunger 21 and transmitted thereby to the tool 10.

A major advantage of the manner of operating a tool by means of this machine is the high degree of accuracy of cut which can be achieved, e. g. in the region AA of the template A corresponding to the leading edge of the aerofoil. For angular changes in the shape of the spline 17 whilst the angle of crank movement varies from $\theta$ to $d\theta$, the table movement is exceedingly small, and thus the rate $$\frac{d\theta}{dX}$$

is very high, due to the cosine effect of the crank movement.

Any scale of reproduction may be attained without alteration of the spline shape, by a simple adjustment of the effective length of the crank 14, and the range of the cutting-head movement normal to the table movement may be varied by altering the distance between the plunger 21 and the fulcrum 18 of the lever-arm 19. By adoption of a suitable fixed distance between the lever fulcrum 18 and the spline datum (i. e. the centre of the cam-follower 20), the effective length of the crank 14 will remain equal to the distance between the plunger 21 and the lever-arm fulcrum 18 and a change in magnitude of both "$x$" and "$y$" ordinates may be effected by a single adjustment.

In the machine illustrated in Figs. 3 to 7 those members which are recognizably and functionally equivalent to those already described as parts of the machine shown in Figs. 1 and 2 are allocated the same reference numerals with the prefix 2; thus, the numeral 210 designates the cutter. This machine is mounted upon a table 30 carrying a fixed frame 31 of which the horizontal slides 212 for the longitudinally slidable carriage 211 form a part. In this case the work-piece A is mounted in a vise 32 which is part of a slide-rest 33 which can be traversed towards and away from the cutting position by means of a conventional lead-screw 34. Conveniently, the member 35 on which the slide-rest 33 is supported is mounted with capability of adjustment longitudinally of the machine upon a slide 36 which is itself fixed to the table 30.

The frame 31 includes two parallel upright members 237, 238 the opposing faces of which constitute a vertical slide for the cross-head 213 which is mounted upon a crank-pin 70 fixed by means of a nut 71 in the crank 214 which is in turn fixed to a spur wheel 39. Said wheel 39 is driven by a motor 40 having on its shaft a pulley 41 which is geared by a belt 42 to a pulley 43 splined on a shaft 44 carried by brackets 45 on the carriage 211, a worm 46 on said shaft 44 meshing with a worm-wheel 47 which transmits motion to the wheel 39 through a reduction train comprising the wheels 48, 49 and 50. The spur wheel 39 is fixed upon a shaft 51 which is rotatably mounted in bearings 2141 in the carriage 211.

A gear wheel 52 on said shaft 51 meshes with a gear wheel 53 which is fixed on a shaft 54 on which is carried the disc 215. Said disc 215 supports a plurality of radially arranged manually-adjustable lead-screws 55, each carrying a sliding nut 56 in which the spline 217 is gripped, and it will be understood that by separately adjusting said screws 55, for which purpose each is furnished with a knob 57, the shape of the spline 217 may be altered to conform to any desired polar diagram according to the variation in "$y$" ordinates demanded by a given profile.

The cam-follower 220 which cooperates with the inner face of the spline 217 is mounted upon a slider 58 adapted by means of rollers 59 to run vertically along a track defined by two parallel rails 60, 61 which are supported in front of the disc 215 by a bracket 62 fixed upon the carriage 211. At its lowest extremity said slider 58 carries a knife-edge 63 which bears against the upper surface of the lever-arm 219, which is fulcrumed upon the carriage 211 at 218. A housing 64 fixed on a bracket 65 mounted on the carriage 211 and movable therewith, incorporates the vertically movable plunger 221 at the foot of which is a stylus 66 arranged to rest upon a rail 67 fixed on the side of the lever arm 219. The housing 64 of the stylus plunger 221 is associated through the medium of suitable telemotor apparatus (not shown) with a slave unit which is incorporated in a housing 68 of the tool of which the cutter is indicated at 210, such apparatus being capable of imparting to the tool vertical adjustments of the position of the cutter 210 in proportionate response to vertical movements of the stylus 66 as the latter is controlled by the movements of the lever arm 219 under the influence of the spline 217 acting upon the cam-follower 220. The cutter 210 is driven by a motor 2101 through an intermediate gear-changing mechanism housed at 69.

The "$x$" ordinate of a desired profile is adjusted by altering the length of the crank 214. This may be achieved by slacking off the nut 71 of the crank-pin 70 and shifting the carriage 211 on its slides 212 until a fresh datum point has been reached at which the desired effective length of the crank 214 has been reached. The scale of reproduction of a given profile shape upon a work-piece may be adjusted by varying simultaneously the effective length of the crank 214 and the ratio of the multiplying lever arrangement, i. e. the ratio of the length of the lever arm 219 between the cam-follower 220 and the fulcrum 218 to the length of the distance between the fulcrum 218 and the point at which the stylus 66 bears against the rail 67.

This effect may be achieved by the arrangement shown, whereby the stylus plunger housing 64 and the parts 65, 68, 69, 210 and 2101 are all carried by a block 72 (Fig. 6) which is capable of being clamped to the carriage 211 by means of a key 73 having an eccentric part 74 which cooperates with a hole 75 in a T-shaped member 76 engaging behind the rear face of said carriage. The rotation of the key 73 by means of the handle 77 is effective to unlock the tool assembly 64, 65, 66, 68, 69, 210 and 2101 from the carriage 211, and if such assembly is then temporarily locked by passing a plug 78 through registering holes 79, 80 respectively provided in a bracket 81 (which is part of said assembly 64) and the frame 31, the carriage 211 may be shifted to alter both the effective lengths of the crank 214 and the lever distance between the fulcrum 218 and the stylus 66.

Figure 8:
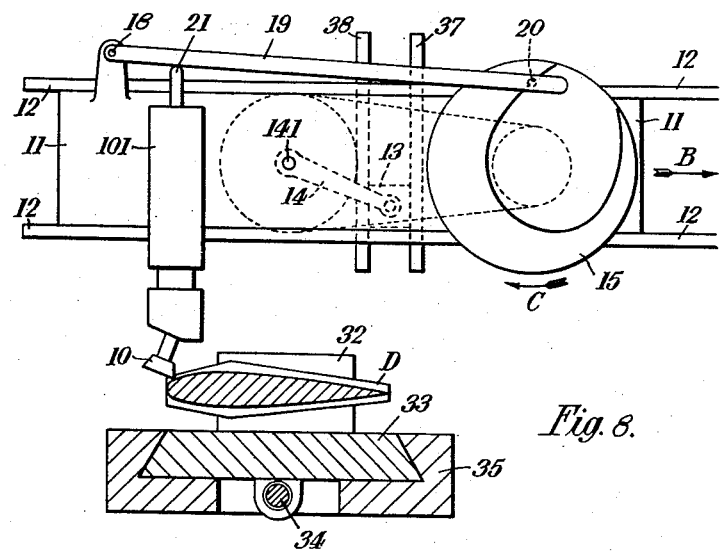
Figs. 8 and 9 are respectively a schematic diagram of a machine for shaping a three-dimensional object, such as an aerofoil, and a detail (similar to Fig. 6) illustrating the modified form of work-piece supporting arrangements which may be used in this embodiment.
Figure 9:
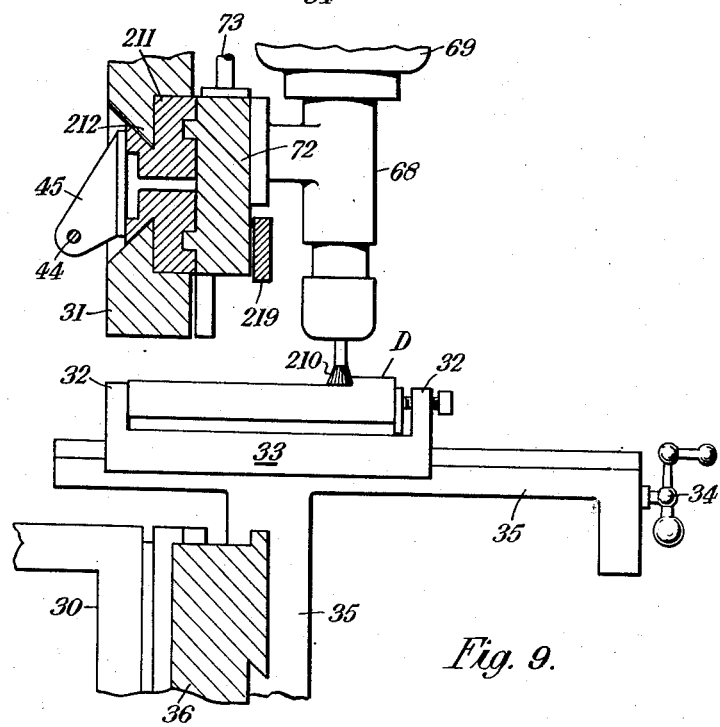

In the modified machine shown in Figs. 8 and 9, a billet D, which is intended to be machined to the shape of an aerofoil, is supported in a vise 32 upon a slide-rest 33 which is capable of being traversed by means of a lead-screw 34 after each chordwise cutting operation of the tool 10 (or 210). The spline 17 (or 217) is set to produce the required sectional profile for a first cut, which would then be made. Subsequent cuts would be taken in planes parallel to that of the first cut, said cuts being spaced by suitable uniform adjustments of the slide-rest traverse screw 34. In the case of a simple aerofoil having a sectional profile of constant geometrical form throughout its span, but merely varying in size, the initial spline setting would be used for all cuts, the necessary changes in magnitude of the "$x$" and "$y$" ordinates being effected by a single adjustment of the effective length of the crank 14 (or 214).

Having completed the desired series of cuts on one side of the billet D, the billet is reversed and the process repeated for profiling the other surface. The degree of surface finish will depend upon the magnitude of the intervals between adjacent cutting planes.

What I claim as my invention and desire to secure by Letters Patent is:

1. A profiling machine comprising a guide means, a carriage mounted thereon for rectilinear movement in a given direction, a cutter head guided for movement on said carriage transversely to said given direction, rotary drive means carried by the carriage for moving same along its guide means said drive means comprising a crank rotatable about a fixed axis on said carriage, a crosshead on said guide means constrained to movement thereon in a straight path extending at right angles to the movement of said carriage, the free end of said crank being pivoted to said crosshead whereby the entire component of angular movement of the crank in the direction of said straight path will be absorbed by said movement of the crosshead without affecting said rectilinear movement of the carriage or the rate of acceleration thereof at various points in its movement, and said displacement of the carriage at any time and the acceleration and deceleration thereof will be equal to similar components of the crank angular movement and the acceleration and deceleration of the free end of the crank in said given direction, and mechanism carried by said carriage operatively interconnecting said drive means with the cutterhead for causing transverse movement of the cutterhead on the carriage, said interconnecting mechanism comprising a cam rotatable on said carriage, means interconnecting said cam and said crank for rotary movement at predetermined fixed ratios, a lever fulcrumed on said carriage and connected to said cutterhead to cause transverse movement of the cutterhead responsive to swinging of said lever about its fulcrum, said lever being in operative engagement with the cam at a location removed from its fulcrum.

2. A machine as claimed in claim 1 wherein the cam is constituted by a flexible spline mounted on the face of the disc, means being provided for adjusting the shape of said spline with reference to the axis of rotation of the disc.

3. A profiling machine comprising a guide means, a carriage mounted therein for horizontal movement, a cutter head guided for vertical movement on said carriage, a cross head, and means guiding same for movement on said guide means transversely to the carriage movement, a crank rotatable about a fixed axis on said carriage and having its free end pivoted to said cross-head, and means carried by the carriage for transmitting rotation to said crank, in combination with a cam mounted for rotation on said carriage, means interconnecting said cam and said crank for rotation at predetermined relative speeds, and a lever fulcrumed on said carriage and operatively connected to said cutter head to cause vertical movement thereof responsive to swinging of the lever about its fulcrum, said lever being operatively associated with said cam to receive swinging movement therefrom, said cam comprising a flexible element, supporting means therefor, and means interconnecting said cam and said supporting means for radially adjusting the profile of said cam relative to its rotational axis.

References Cited in the file of this patent

UNITED STATES PATENTS

| | | |
|---|---|---|
| 2,355,812 | Martindell | Aug. 15, 1944 |
| 2,431,604 | Birmann | Nov. 25, 1947 |
| 2,480,102 | Weisglass | Aug. 30, 1949 |

FOREIGN PATENTS

| | | |
|---|---|---|
| 273,154 | Switzerland | Jan. 31, 1951 |
| 696,417 | Great Britain | Sept. 2, 1953 |